US006239697B1

(12) United States Patent
Murao

(10) Patent No.: US 6,239,697 B1
(45) Date of Patent: May 29, 2001

(54) FIRE ALARM SYSTEM

(75) Inventor: Shuichi Murao, Tokyo (JP)

(73) Assignee: Nohmi Bosai Ltd., Tokyo (JP)

(*) Notice: Subject to any disclaimer, the term of this patent is extended or adjusted under 35 U.S.C. 154(b) by 0 days.

(21) Appl. No.: 09/333,295

(22) Filed: Jun. 15, 1999

(30) Foreign Application Priority Data

Jun. 15, 1998 (JP) ........................................ 10-167591

(51) Int. Cl.[7] .......................... G08B 26/00; G05B 23/62

(52) U.S. Cl. .......................... 340/506; 340/505; 340/514; 340/588

(58) Field of Search .......................... 340/506, 505, 340/514, 825.06, 225.07, 628, 588, 589

(56) References Cited

U.S. PATENT DOCUMENTS

| | | | | |
|---|---|---|---|---|
| 4,901,316 | | 2/1990 | Igarashi et al. | 340/825 |
| 4,924,417 | | 5/1990 | Yuasa | 340/506 |
| 4,947,162 | * | 8/1990 | Kimura | 340/825.07 |
| 4,988,988 | * | 1/1991 | Kimura | 340/825.06 |
| 4,996,518 | | 2/1991 | Takahashi et al. | 340/505 |
| 5,302,941 | * | 4/1994 | Berube | 340/505 |
| 5,353,009 | * | 10/1994 | Marsh et al. | 340/506 |
| 5,530,896 | * | 6/1996 | Gilbert | 340/825.07 |
| 5,570,085 | * | 10/1996 | Bertsch | 340/825.07 |
| 5,619,184 | * | 4/1997 | Torikoshi et al. | 340/506 |
| 5,701,115 | | 12/1997 | Right et al. | 340/505 |

* cited by examiner

*Primary Examiner*—Donnie L. Crosland
(74) *Attorney, Agent, or Firm*—Wenderoth, Lind & Ponack, L.L.P.

(57) ABSTRACT

For storing identification number information of terminals in a reception unit such as a fire control and indicating equipment, it is unnecessary to replace a memory with another at a factory or an installation site. Moreover, a man-made error accompanying a modification work is prevented. In a fire alarm system, a plurality of fire supervising or control terminals are connected to the reception unit. Identification number information that varies depending on the type of a terminal is assigned to the plurality of terminals. The reception unit includes an electrically rewriteable nonvolatile memory, an acquisition device, and a rewriting device. The identification number information of the plurality of connected terminals is stored in the nonvolatile memory that is electrically programmable. The acquisition device acquires identification number information from the plurality of terminals. The rewriting device stores, in response to an instruction, the identification number information of the plurality of terminals, which is acquired by the acquisition device, in the nonvolatile memory so as to thus rewrite the contents of the nonvolatile memory.

34 Claims, 9 Drawing Sheets

FIRE ALARM SYSTEM

BACKGROUND OF THE INVENTION

1. Field of the Invention

The present invention relates to a fire alarm system.

2. Description of the Related Art

In conventional fire alarm systems, fire monitoring or supervising terminals and control terminals for controlling smoke prevention/exhaustion equipment and other controlled equipment are connected to a reception unit such as a fire control and indicating equipment or a fire transmitter. The fire supervising and control terminals are realized with fire sensors or transmitters to which the fire sensors or devices to be controlled are connected.

The reception unit, for example, the fire control and indicating equipment receives fire information such as a fire signal or a physical quantity signal representing a fire phenomenon from a fire supervising terminal by, for example, polling the terminal. It is judged from the received fire information if a fire has broken out. A smoke prevention/exhaustion equipment associated with a district in which the fire has broken out is controlled based on the result of the judgment.

The foregoing fire alarm system judges from fire information, which the fire control and indicating equipment receives from a fire supervising terminal, if a fire has broken out. The fire supervising terminal is realized with a so-called analog fire sensor, a so-called on/off fire sensor, or a transmitter. The analog fire sensor transmits a physical quantity signal representing a fire phenomenon. The on/off fire sensor judges if the detected fire phenomenon stems from a fire, and transmits a fire signal in case of a fire. The transmitter has a plurality of on/off fire sensors connected thereto, and transmits a fire signal in response to a fire signal sent from any of the sensors.

The analog fire sensor includes a heat analog fire sensor, a smoke analog fire sensor, a flame analog fire sensor, and a gas analog fire sensor. The heat analog fire sensor transmits a physical quantity signal representing, for example, temperature. The smoke analog fire sensor transmits a physical signal indicating smoke. The flame analog fire sensor transmits a physical quantity signal indicating flame light (radiating light). The gas analog fire sensor transmits a physical quantity signal indicating gas. Moreover, the on/off fire sensor includes a heat fire sensor of a constant temperature type, differential type, or constant temperature differential type, a smoke fire sensor of a photoelectric type or ionization type, a flame fire sensor of an infrared type or ultraviolet type, and a gas-fire sensor. Moreover, the controlled equipment is mutually different in terms of a control time and control sequence.

For processing fire information sent from the analog fire sensor, the kind of fire information to be received varies depending on the type of the analog fire sensor. The reception unit such as the fire control and indicating equipment or transmitter to which the fire supervising terminals are connected must judge from the fire information if a fire has broken out. The same applies to judgment of a fire from a fire signal sent from the on/off fire sensor or transmitter. Moreover, the same applies to control of the controlled equipment.

In the conventional fire alarm systems, a reception unit such as a fire control and indicating equipment or a transmitter is provided with a so-called terminal mapping memory such as an EPROM. Identification number information that is type information of a plurality of fire supervising terminals or control terminals connected to the reception unit is stored in the memory. The identification number information stored in the memory is referenced in order to carry out fire supervising or a control sequence.

The memory is produced and incorporated in the reception unit at a factory before delivery of the reception unit. For example, after the fire alarm system is installed, the fire supervising terminals or control terminals may have to be changed or modified because of a change in the plan of a building or a change in the purpose of use. In this case, an EPROM in which the contents of the change or modification are described must be produced at a factory. Otherwise, an expert must bring a ROM writer into the installation site to rewrite the contents of an old ROM. It is thus time-consuming to renew a ROM. Moreover, a setting error may occur.

SUMMARY OF THE INVENTION

In view of the above, the present invention is intended to obviate the above-mentioned problems, and has for its object to provide a novel and improved fire alarm system of the character as described which is capable of obviating the necessity of modifying the identification number information at a factory, and of replacing a memory with another at an installation site in order to modify identification number information of terminals and store it in a reception unit.

Another object of the present invention is to provide a novel and improved fire alarm system of the character described which is capable of eliminating the need for bringing a writer used to rewrite a memory to an installation site of the fire alarm system, and changing or modifying the contents of the memory.

A further object of the present invention is to provide a novel and improved fire alarm system of the character described which is capable of preventing manmade errors accompanying the memory-contents changing or modifying work.

A still further object of the present invention is to provide a novel and improved fire alarm system of the character described which is capable of preventing the setting of a non-acquisition mode from being forgotten.

A yet further object of the present invention is to provide a novel and improved fire alarm system of the character described which is capable of selecting any mode of operation merely by manipulating a supervision instructing means.

A further object of the present invention is to provide a novel and improved fire alarm system of the character described which is capable of automatically acquiring terminal data if there is no terminal data present in a nonvolatile memory, or if the existing terminal data stored therein is abnormal, thus making it possible to perform supervision in a reliable manner.

A further object of the present invention is to provide a novel and improved fire alarm system of the character described which is capable of rewriting terminal data stored in a nonvolatile memory as required, while eliminating the need of manually inputting data for rewriting the terminal data, thus preventing writing errors.

Bearing the above objects in mind, according to a first aspect of the present invention, there is provided a fire alarm system comprising: a plurality of fire supervising or control terminals serving as fire detectors and having identification number information assigned thereto that varies depending on the type of a terminal; and a reception unit connected to the plurality of fire supervising or control terminals. The fire alarm system is featured in that the reception unit comprises: a nonvolatile memory for storing therein the identification number information of the plurality of terminals connected to the reception unit; acquisition means for acquiring identification number information from the plurality of terminals; and rewriting means for, in response to an instruction, storing the identification number information of the plurality of terminals acquired by the acquisition means in the nonvolatile memory so as to rewrite the contents of the nonvolatile memory.

In a preferred form according to the first aspect of the invention, the rewriting means comprises a mode setter for specifying a non-acquisition mode in the nonvolatile memory when the identification number information acquired by the acquisition means is stored in the nonvolatile memory in order to rewrite the contents of the nonvolatile memory, and the reception unit further comprises mode judging means for, when the reception unit is powered or reset, judging if the non-acquisition mode has been specified in the nonvolatile memory, so that it carries out fire supervision according to the identification number information stored in the nonvolatile memory when the non-acquisition mode has been specified, but allows the acquisition means to acquire Is identification number information from the plurality of terminals, while carrying out fire supervision according to the acquired identification number information when the non-acquisition mode has not been specified.

According to a second aspect of the present invention, there is provided a fire alarm system comprising: a plurality of fire supervising or control terminals serving as fire detectors and having identification number information assigned thereto that varies depending on the type of a terminal; and a reception unit connected to the plurality of fire supervising or control terminals. The fire alarm system is featured in that the reception unit comprises: a nonvolatile memory for storing therein the identification number information of the plurality of terminals connected to the reception unit; acquisition means for acquiring identification number information from the plurality of terminals; and supervision instructing means for instructing whether fire supervision should be performed based on the contents of the nonvolatile memory or fire supervision should be performed by acquiring identification number information from the terminals using the acquisition means.

In a preferred form according to the second aspect of the invention, during the time the supervision instructing means instructs that fire supervision should be performed based on the contents of the nonvolatile memory, the reception unit checks the contents of the nonvolatile memory when the reception unit is powered or reset, acquires identification number information from the plurality of terminals through the acquisition means if the contents of the nonvolatile memory are abnormal, and performs fire supervision according to the identification number information acquired by the acquisition means.

In another preferred form according to the second aspect of the invention, the reception unit further comprises storage instructing means for storing the identification number information acquired by the acquisition means, the storage instructing means being operated upon manipulation thereof such that the identification number information acquired by the acquisition means is stored in the nonvolatile memory in order to rewrite the contents of the nonvolatile memory.

In a further preferred form of the invention, different addresses are assigned to the plurality of terminals; the acquisition means acquires the addresses from the plurality of terminals together with identification number information; and the addresses are stored in the nonvolatile memory together with the identification number information.

According to a third aspect of the present invention, there is provided a fire alarm system comprising: a plurality of fire supervising or control terminals serving as fire detectors and having identification number information assigned thereto that varies depending on the type of a terminal; and a reception unit connected to the plurality of fire supervising or control terminals. The fire alarm system is featured in that the reception unit comprises: a nonvolatile memory for storing therein the identification number information of the plurality of terminals connected to the reception unit; acquisition means for acquiring identification number information from the plurality of terminals; and acquisition instructing means for outputting an acquisition instruction for allowing the acquisition means to acquire information.

In a preferred form according to the third aspect of the invention, the reception unit further comprises rewriting means for storing the identification number information of the plurality of terminals, which the acquisition means has acquired in response to an acquisition instruction sent from the acquisition instructing means, in the nonvolatile memory so as to rewrite the contents of the nonvolatile memory.

In a further preferred form according to the third aspect of the invention, the rewriting means stores, in response to an instruction, the identification number information of the plurality of terminals acquired by the acquisition means in the nonvolatile memory so as to rewrite the contents of the nonvolatile memory.

In a further preferred form of the invention, the fire detector is a fire sensor.

In a further preferred form of the invention, the fire detector is a transmitter to which a fire sensor or a device to be controlled is connected.

The above and other objects, features and advantages of the present invention will more readily be understood to those skilled in the art from the following detailed description of preferred embodiments of the invention when taken in conjunction with the accompanying drawings.

DESCRIPTION OF THE PREFERRED EMBODIMENTS

Now, presently preferred embodiments of the present invention will be described while referring to the accompanying drawings.

Figure 1:
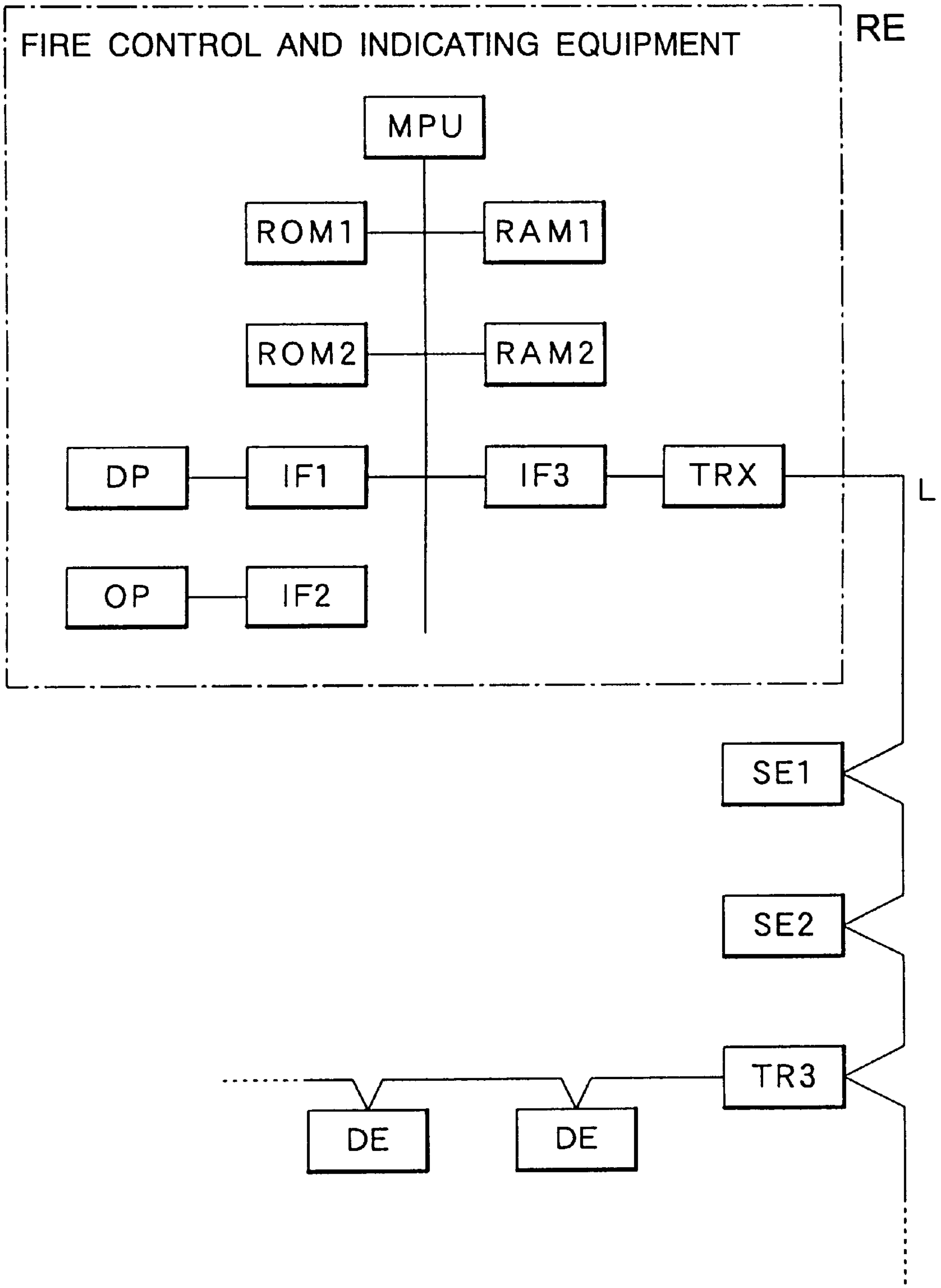
FIG. 1 is a block diagram of a fire alarm system in accordance with the present invention.
Figure 2:
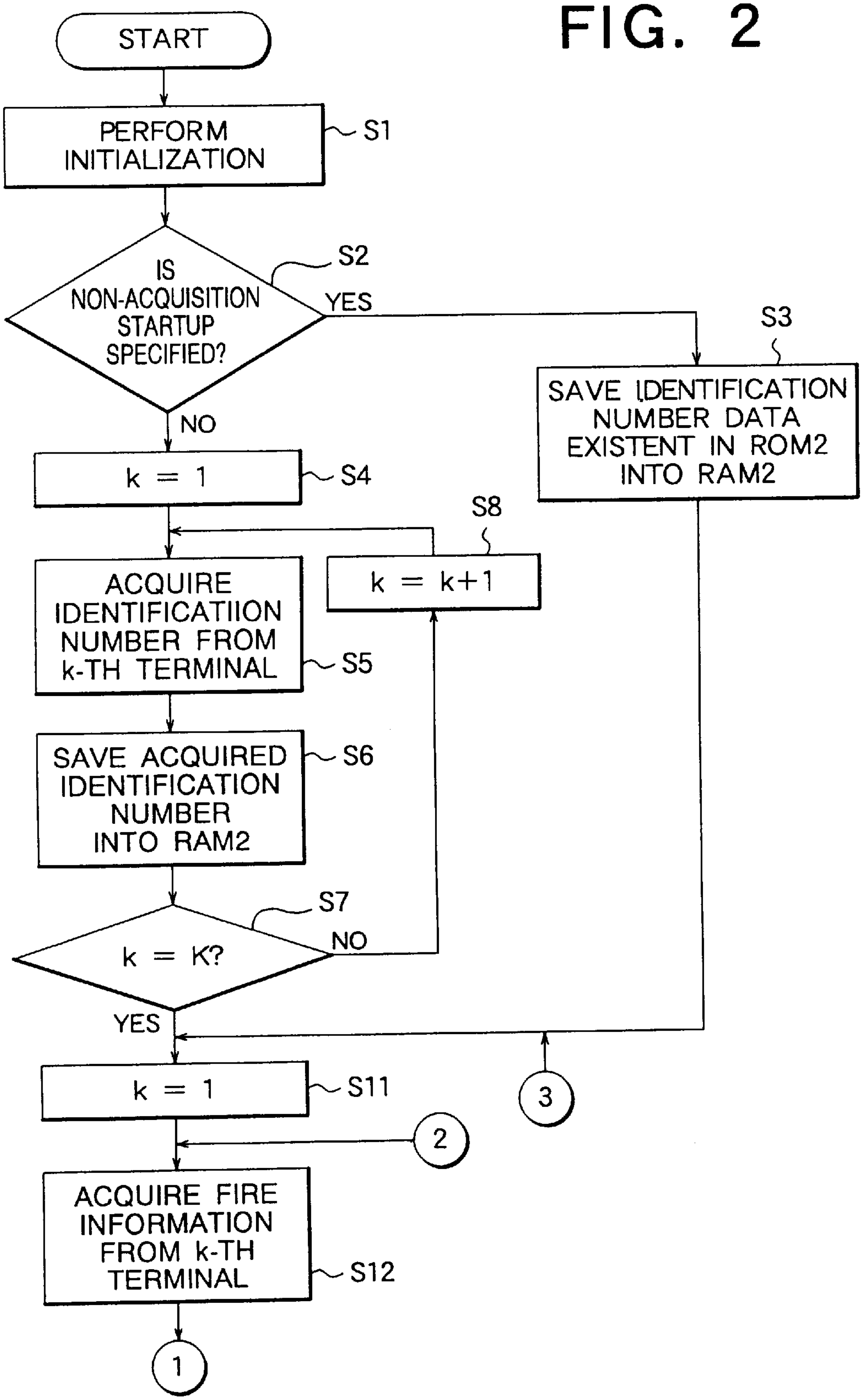
FIG. 2 is a flowchart showing one half of the operation of the fire alarm system according to a first embodiment of the present invention.
Figure 3:
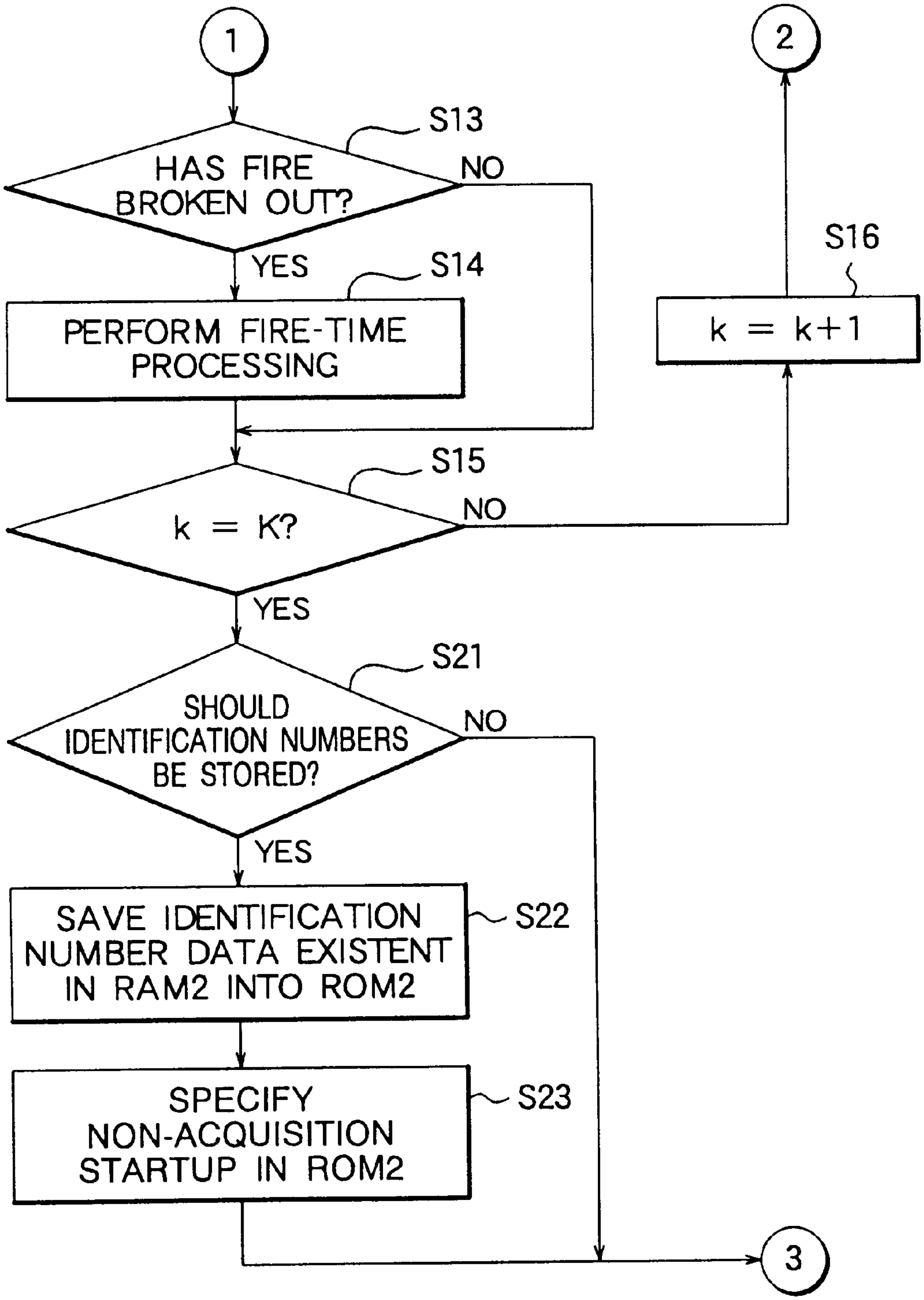
FIG. 3 is a flowchart showing the other half of the operation of the fire alarm system continuous to FIG. 2.

Referring to the drawings and first to FIG. 1, therein is illustrated in a block diagram a general construction of a fire alarm system in accordance with a first embodiment of the present invention. FIG. 2 and FIG. 3 are flowcharts which show in combination the operation of this embodiment.

In FIG. 1, a plurality of fire supervising terminals SE1, SE2, TR3 and the like are connected to a fire control and indicating equipment, generally designated at a reference symbol RE, through a power and signal line L. The fire supervising terminals SE1 and SE2 may each comprise a so-called analog-type fire sensor for detecting a fire phenomenon such as heat, smoke, flame, gas, or smell that is generated in case of a fire, and notifying a physical quantity representative of such a fire phenomenon. The fire supervising terminal TR3 may comprise a transmitter to which a so-called on/off fire sensor DE is connected. The on/off fire sensor DE outputs a fire signal when detecting a fire phenomenon judged to stem from a fire.

The analog fire sensors SE1 and SE2, etc., and the relays TR3, etc., are provided with an address setter (for example, an ordinary DIP switch, a rotary DIP switch, or an EEPROM) and a group address setter which are not shown. The address setter is used to set the address of an own analog fire sensor. The group address setter is used to set a group address of a group to which an own analog fire sensor belongs. Moreover, an identification number setter similar to the address setter is included for setting identification number information (type information) indicating the type of an own analog fire sensor.

Aside from the fire supervising terminals, a control transmitter for controlling smoke prevention/exhaustion equipment can be connected to the receiver RE. In this embodiment, the control transmitter is neither illustrated nor described.

The fire control and indicating equipment RE comprises a microcomputer MPU and nonvolatile memories such as a ROM 1 and a ROM 2. The ROM 1 may comprise an EPROM in which a program shown in an operational flow in FIG. 2 and FIG. 3 is stored. The ROM 2 stores therein the address numbers of the fire supervising terminals SE1, SE2, TR3, etc. Also stored in the ROM 2 are the identification numbers of an analog heat fire sensor, an analog photoelectric fire sensor, an analog gas fire sensor, a fire supervising transmitter, a control transmitter and the like, and a procedure for starting up the fire control and indicating equipment RE at the time of powering the fire control and indicating equipment or system reset. The ROM 2 may comprise an electrically rewriteable ROM such as an EEPROM.

The fire control and indicating equipment RE further includes a RAM 1 which is used as a work memory, and a RAM 2 which serves as a run-time memory to store the addresses and identification numbers of a plurality of fire supervising and control terminals connected to the fire control and indicating equipment RE for fire supervision and control. In this embodiment, the RAM 2 is used to store the addresses and identification numbers of the terminals SEl, SE2, TR3, etc.

The fire control and indicating equipment RE further includes an indicator DP, an operation unit OP, a transmission/reception circuit TRX and interfaces IF1–IF3. Though not shown, the indicator DP has a district indicator lamp indicating a fire alarm district in which a fire has broken out, an LCD or counter indicator, and various kinds of indicator lamps. The indicator lamps indicate that data is being accumulated, a test is under way, sound is stopped, and a switch must be turned on or off carefully. The operation unit OP has various switches (not shown) including a test switch, a sound stop switch, a control switch, a fire alarm resetting switch, a power switch, and a system reset switch, as well as a storage switch and so on. The transmission/reception circuit TRX includes a parallel-to-series conversion circuit, a transmission circuit, a reception circuit, and a series-to-parallel conversion circuit, all of which are not illustrated. Incidentally, the power switch, system reset switch, and storage switch may be incorporated in the receiver RE. Moreover, the interfaces IF1, IF2, and IF3 are used to connect the microcomputer MPU to the indicator DP, operation unit OP, and transmission/reception circuit TRX.

Next, the operation of the first embodiment will be described with reference to FIG. 2 and FIG. 3.

Assume that the power switch of the fire control and indicating equipment RE is turned on or that the system reset switch is turned on while the fire control and indicating equipment is in operation. The microcomputer MPU initializes the RAMs 1 and 2, and checks if the contents of the ROM 2 are normal (step S1). For checking the ROM 2, a required total (summation check code) of terminal data such as addresses or identification numbers or of stored data such as system startup designation codes is stored in an area other than a storage area for the stored data. Stored data items are summated, and it is checked if the sum agrees with the summation check code. If they disagree with each other, the contents of the ROM 2 are cleared.

When initialization is completed, the microcomputer NPU checks if non-acquisition startup is specified as a system startup procedure in the ROM 2 (step S2). If non-acquisition startup is specified in the ROM 2, the address and identification number of a terminal are read from the ROM 2 and saved in the RAM 2 (step S3).

If it is found at step S2 that non-acquisition startup is not specified ("No" at step S2), the address of a terminal, k, is set to 1 (step S4). The k-th terminal, or in this case, the first terminal is polled and called. An identification number return instruction is issued, and the identification number of the called k-th terminal is acquired (step S5). The identification number acquired from the k-th terminal is saved at an address k associated with the k-th terminal in the RAM 2 (step S6). The acquisition of an identification number is repeated by polling terminals until the identification number of a terminal associated with the last address is acquired (steps S5 to S8).

As mentioned above, the addresses and identification number information of the fire sensors SE1, SE2, etc., and the relays TR3, etc. that are terminals, which are stored in the ROM 2, are saved in the RAM 2 (step S3). Otherwise, the addresses and identification number information acquired from the terminals are saved in the RAM 2 (step S6). With the completion of the saving, fire supervision is run based on the addresses and identification number information of the terminals stored in the RAM 2.

First, the address k is set to 1 (step S11). For acquiring fire information from the k-th terminal, or in this case, the first terminal, the call address No. 1 of the terminal to be polled and a fire information return instruction are transmitted. The fire sensor SE1 addressed with No. 1 transmits a physical quantity signal representing a fire phenomenon as fire information, for example, a physical quantity signal indicating smoke to the receiver RE. The receiver RE saves the received fire information in the RAN 1 (step S12).

Thereafter, the microcomputer MPU reads the identification number from the address k in the RAM 2, and judges if a fire has broken out. In this case, if the identification number of the first terminal means an analog photoelectric fire sensor, it is judged if the level of the physical quantity signal indicating smoke agrees with a fire level. If the level of the physical quantity signal is equal to or higher than the fire level, an accumulation timer associated with the first terminal and defined in the RAM 1 is counted up by one. It is judged if the accumulation time has reached a predetermined one. If the accumulation time has reached the predetermined one, it is judged that a fire has broken out ("Yes" at step S13). Fire-time processing is carried out (step S14). Specifically, a fire alarm district concerned is indicated in the indicator DP. Moreover, a main sounding unit and district sounding units are sounded. The main sounding unit that is not shown is included in the receiver RE. Also, the district sounding units are installed on every floor so that when a fire has broken out, the sounding units on a firing floor and on an immediate upper floor are operated. Moreover, when controlled equipment including smoke prevention/exhaustion equipment is connected, the controlled equipment associated with the fire alarm district in which a fire has broken out is controlled via a control transmitter. When the control transmitter is connected over the power and signal line, an address signal representing the address of the controlled equipment and a control instruction are sent from the receiver RE.

When the fire-time processing (step S14) has been carried out or if it is judged at step S13 that no fire has broken out, control is passed to step S15. Specifically, assume that the terminal concerned is the first terminal. At this time, the level of a physical quantity signal may not have reached the fire level. Otherwise, although the level of the physical quantity signal has reached the fire level, the accumulation timer may not have reached the predetermined accumulation time. In this case, control is passed to step S15. It is then judged if k indicates the last number. If k does not indicate the last number ("No" at step S15), k is incremented (step S16). A terminal of the next address is polled for acquiring fire information. It is then judged if a fire has broken out (steps S12, S13, and S14).

Thereafter, the microcomputer MPU judges if the storage switch of the operation unit OP has been manipulated, that is, if data existent in the RAN 2 for use in running fire supervision should be saved into the ROM 2 (step S21). If the storage switch has been manipulated ("Yes" at step S21), address data and identification number data are read from the RAM 2 and written in a predetermined data storage area in the ROM 2. A sum of the data items is calculated and stored in a sum storage area in the ROM 2 (step S22). The addresses and identification number information acquired by polling the plurality of fire supervising and control terminals can thus be stored.

Moreover, the microcomputer MPU stores the data of the addresses and identification numbers existent in the RAM 2 into the ROM 2. A non-acquisition startup mode is specified in a startup mode storage area in the ROM 2 by, for example, setting a flag bit. Consequently, when the fire control and indicating equipment is powered next or system reset is carried out next, the fire control and indicating equipment is started up automatically according to the address data and identification number data stored in the ROM 2.

Figure 4:
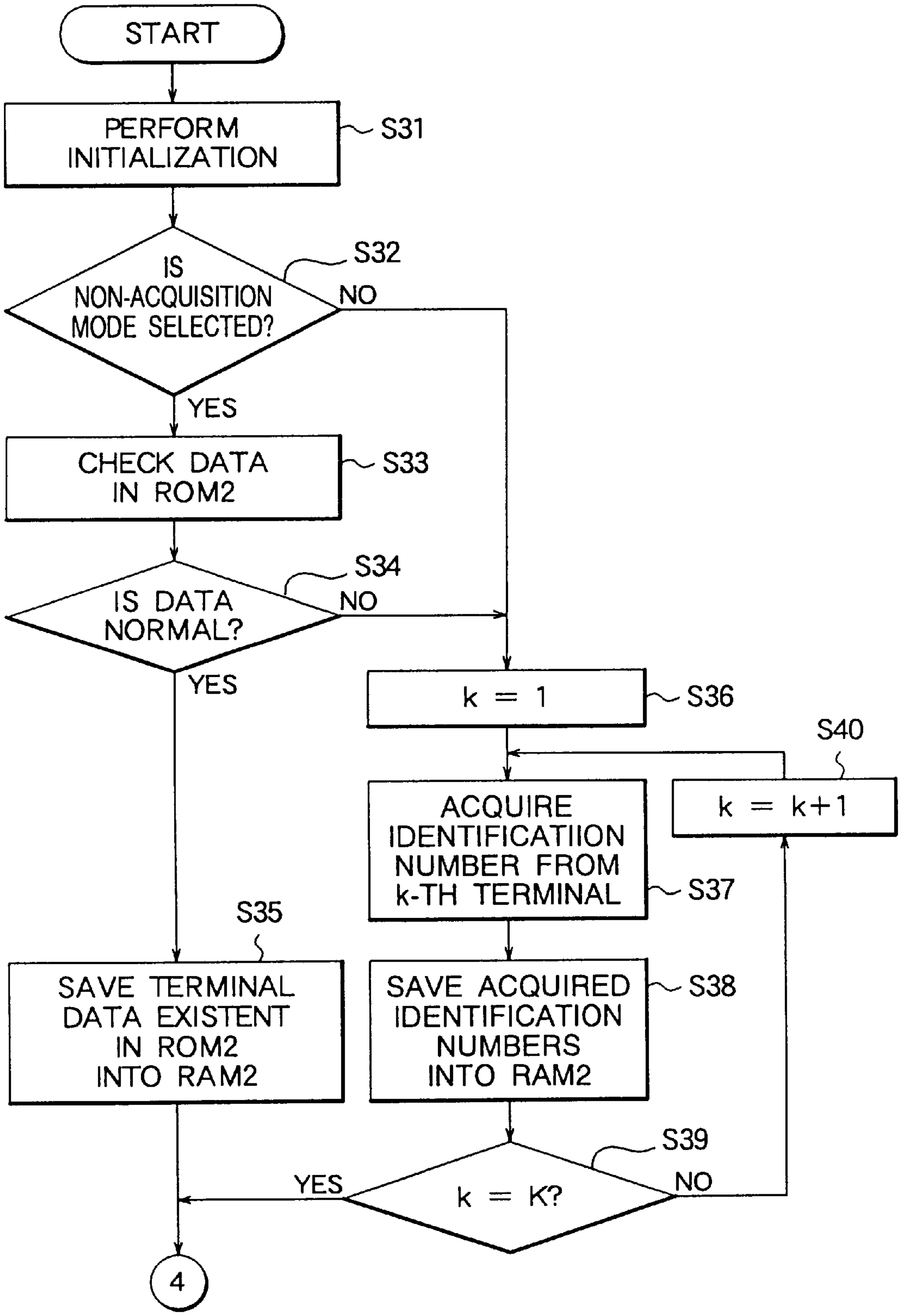
FIG. 4 is a flowchart showing one half of the operation of the fire alarm system according to a second embodiment of the present invention.
Figure 5:
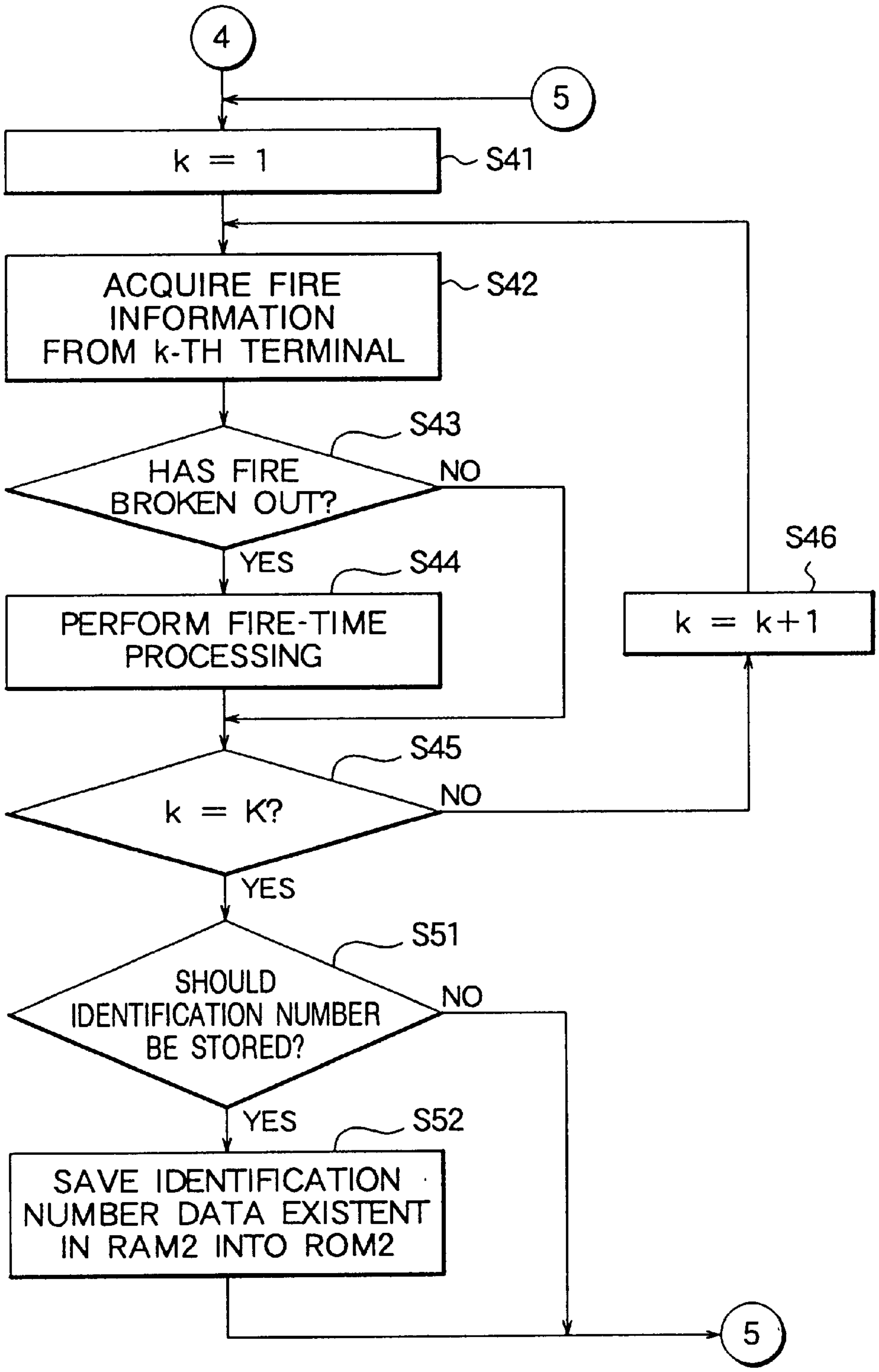
FIG. 5 is a flowchart showing the other half of the operation of the fire alarm system continuous to FIG. 4.

FIG. 4 and FIG. 5 are flowcharts showing an operation according to a second embodiment of the present invention. The second embodiment is different from the aforesaid embodiment in a feature described below. That is to say, a startup mode switch (startup mode selecting means) is included for designating a startup mode. The startup mode switch is used to designate an acquisition mode or non-acquisition mode. In the acquisition mode, when the fire control and indicating equipment is powered or system reset is carried out, an address and/or identification number information are acquired from the plurality of fire supervising and control terminals connected to the fire control and indicating equipment. In the non-acquisition mode, the addresses and/or identification number information of the plurality of fire supervising and control terminals that are stored in a memory such as an EEPROM are utilized.

When the mode switch is set to the acquisition mode, an address and identification number information are acquired from the terminals at the time of powering or reset, and then stored in the RAM 2. The stored addresses and identification number information are used to carry out fire supervision. When the mode switch is set to the non-acquisition mode, the addresses and identification number information stored in the ROM 2 that is an EEPROM or the like are read and saved in the RAM 2. Fire supervision is then carried out. If data stored in the ROM 2 is incorrect or no data is stored, the fact is indicated. Also, an address and identification number information are acquired from the terminals and stored in the RAM 2. Fire supervision is then carried out.

Referring to FIG. 4 and FIG. 5, the operation performed in the second embodiment will be described. The configuration of a fire control and indicating equipment of the second embodiment is identical to that of the first embodiment except a point that the mode switch for use in selecting the non-acquisition mode or acquisition mode is added to the operation unit OP shown in FIG. 1.

When the power switch is turned on or the system reset switch is manipulated, the microcomputer MPU in the fire control and indicating equipment RE initializes the RAM 1 and RAM 2 (step S31). It is then judged if the mode switch of the operation unit OP is set to the non-acquisition mode or acquisition mode (step S32).

If the mode switch is set to the acquisition mode ("No" at step S32), identification number information is acquired at steps S36 to S40. The acquisition steps S36 to S40 are identical to steps S5 to S8 in FIG. 2 concerning the first embodiment. The description of the acquisition steps will therefore be omitted.

When the mode switch is set to the non-acquisition mode ("Yes" at step S32), the microcomputer MPU checks the contents of the ROM 2 (step S33). For this checking, it is checked if terminal data including the addresses and identification number information of the plurality of terminals is present in the ROM 2. If the terminal data is present, a required total (summation check code) of the stored terminal data is stored in an area other than a storage area for the stored data. Stored data items are summated, and it is checked if the sum agrees with the summation check code.

If the contents of the ROM 2 checked are found normal ("Yes" at step S34), the terminal data including the addresses and identification numbers is read from the ROM 2, and saved in the RAM 2. The terminal data is used to run fire supervision (step S35).

If the contents of the ROM 2 checked are found to be abnormal ("No" at step S34), the contents of the ROM 2 are not used for fire supervision, but control is passed to step S36. The actions of steps S36 to S40 are then carried out. If the contents of the ROM 2 are judged to be abnormal, the indicator DP indicates the fact and gives an alarm. The ROM 2 may be cleared (initialized) automatically or only an abnormal area in the ROM 2 may be cleared.

When the addresses and identification numbers for use in running fire supervision have been stored in the RAM 2, fire supervision and storage of addresses and identification numbers are carried out. The fire supervision includes steps S41 to S46, while the storage includes steps S51 and S52. The actions of steps S41 to S46 for fire supervision are identical to steps S11 to S16 shown in FIG. 2 and FIG. 3. The storage including steps S51 and S52 is identical to that including steps S21 and S22 in FIG. 3. Thus, the description of the storage is omitted.

Figure 6:
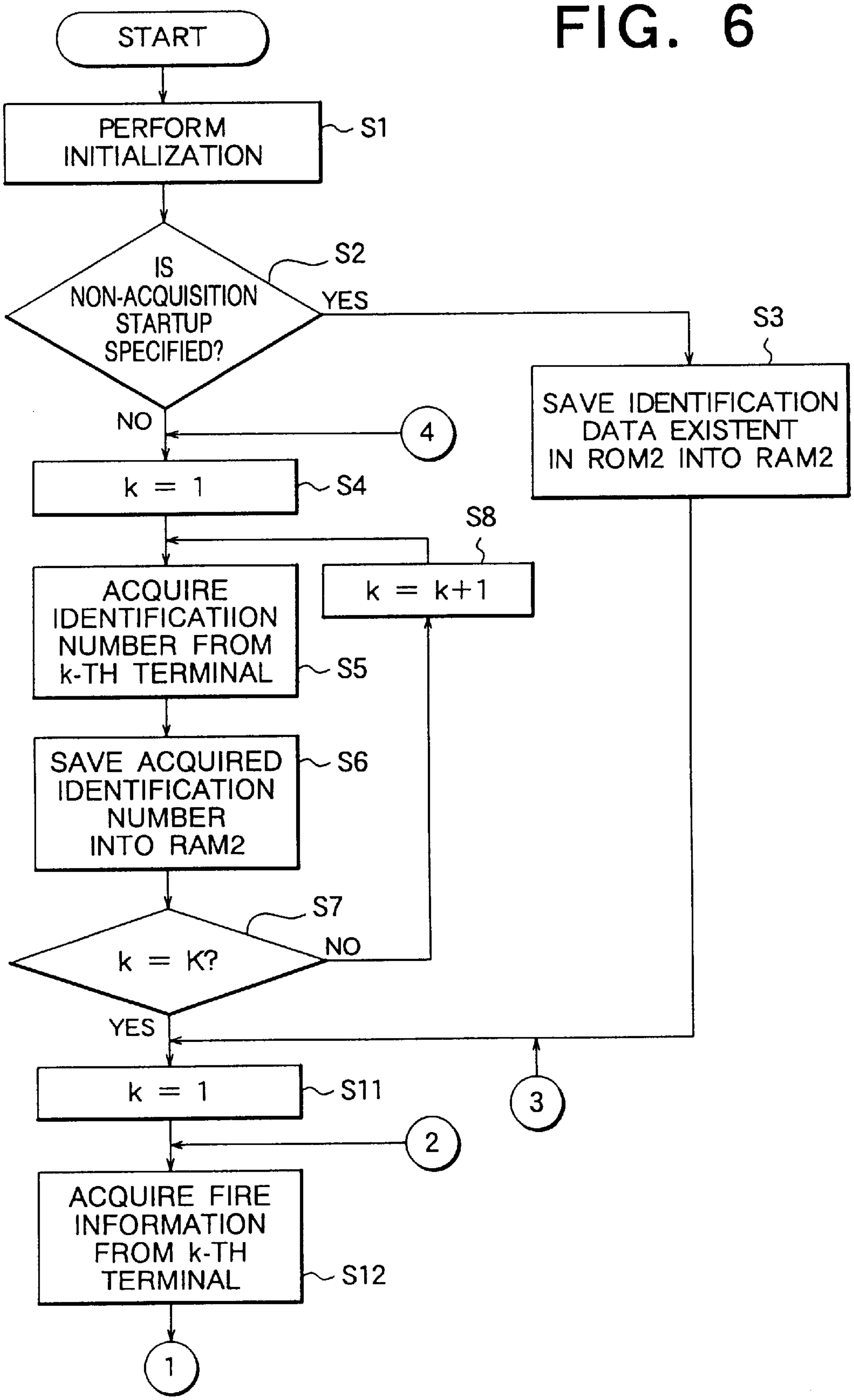
FIG. 6 is a flowchart showing one half of the operation of the fire alarm system according to a third embodiment of the present invention.
Figure 7:
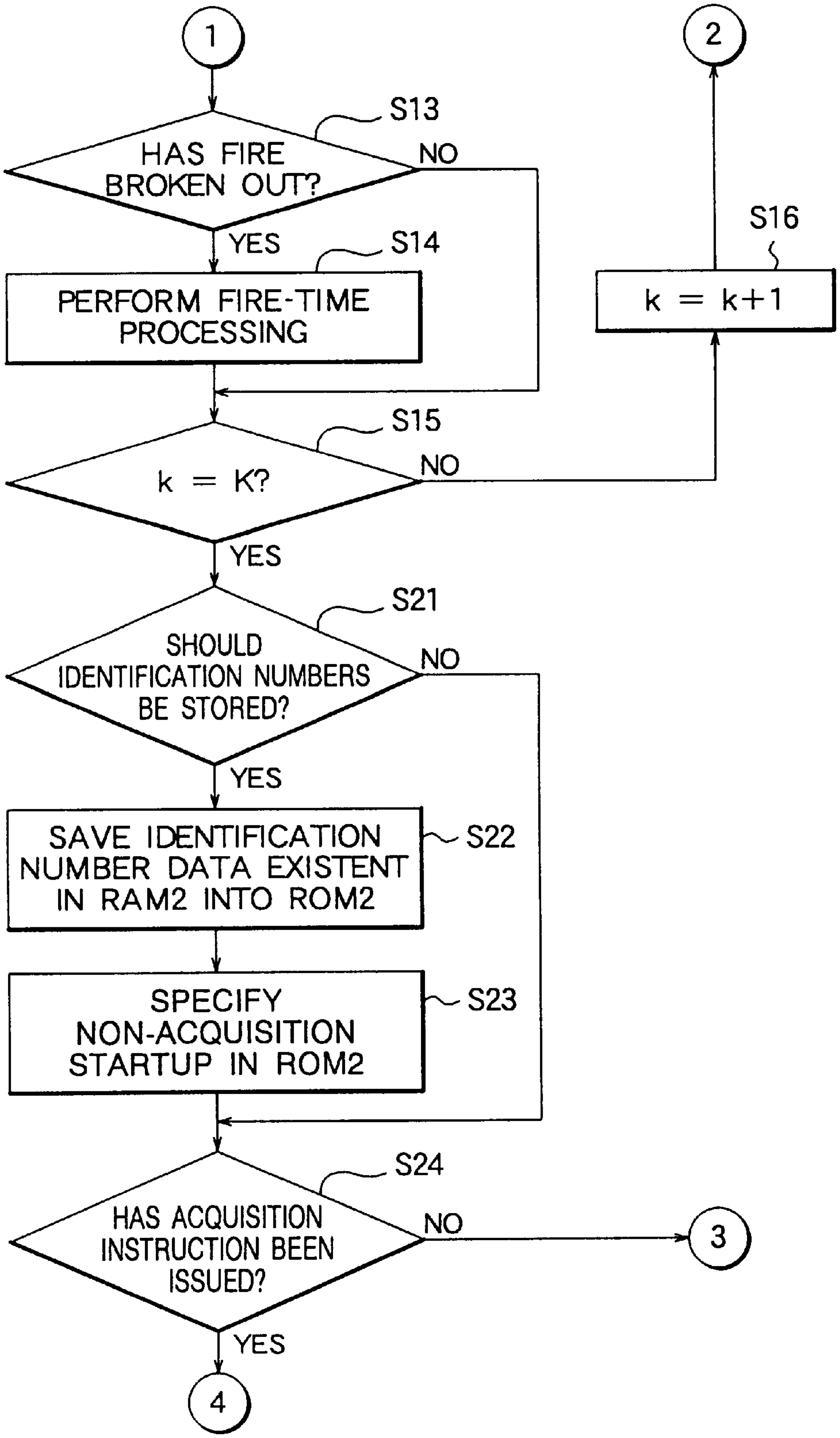
FIG. 7 is a flowchart showing the other half of the operation of the fire alarm system continuous to FIG. 6.

FIG. 6 and FIG. 7 are flowcharts showing an operation to a third embodiment of the present invention. The third embodiment is different from the first embodiment shown in FIG. 2 and FIG. 3 in a feature described below. An acquisition instruction switch (not shown) is added to the operation unit OP of the fire control and indicating equipment RE in FIG. 1. The acquisition instruction switch is used to acquire identification number information (type information) from the terminals including the fire sensors SE1 and SE2 and the transmitter TR3. If a judgment is made in the negative at step S21, or after step S23 is completed, an action of step S24 is carried out for judging if the acquisition instruction switch has been manipulated. If a judgment is made in the negative at step S24, or if the acquisition instruction switch has not been manipulated, control is returned to step S11. If a judgment is made in the affirmative at step S24, that is, if the acquisition instruction switch has been manipulated, control is returned to step S4. Except this point, the third embodiment is identical to the first embodiment.

Assume that the acquisition instruction switch (or an acquisition instruction switch included in a transmitter serving as a reception unit) of the operation unit OP included in the receiver RE is manipulated over a predetermined time (for example, 5 sec) in the course of fire supervision including step S11 and subsequent steps. Owing to the above system structure, the fire control and indicating equipment RE (or a transmitter serving as a reception unit) acquires, similarly to the one in the first embodiment, identification number information successively from the terminals SE1, SE2, TR3, etc. The acquired identification number information is saved in the RAM 2 (steps S4 to S8). Assume that the storage switch of the operation unit OP has been manipulated ("Yes" at step S21). In this case, the identification number information of the terminals SE1, SE2, TR3, etc. existent in the RAM 2 is, similarly to that in the first embodiment, stored in the ROM 2 (EEPROM) (step S22).

If it is found at step S24 that the acquisition instruction switch has been manipulated, identification number information may be acquired from the terminals and stored automatically in the ROM 2 at the same time. Moreover, the action of step S24 may be performed between steps S11 and S12. In this case, if a judgment is made in the negative at step S24, control is passed to step S12.

Figure 8:
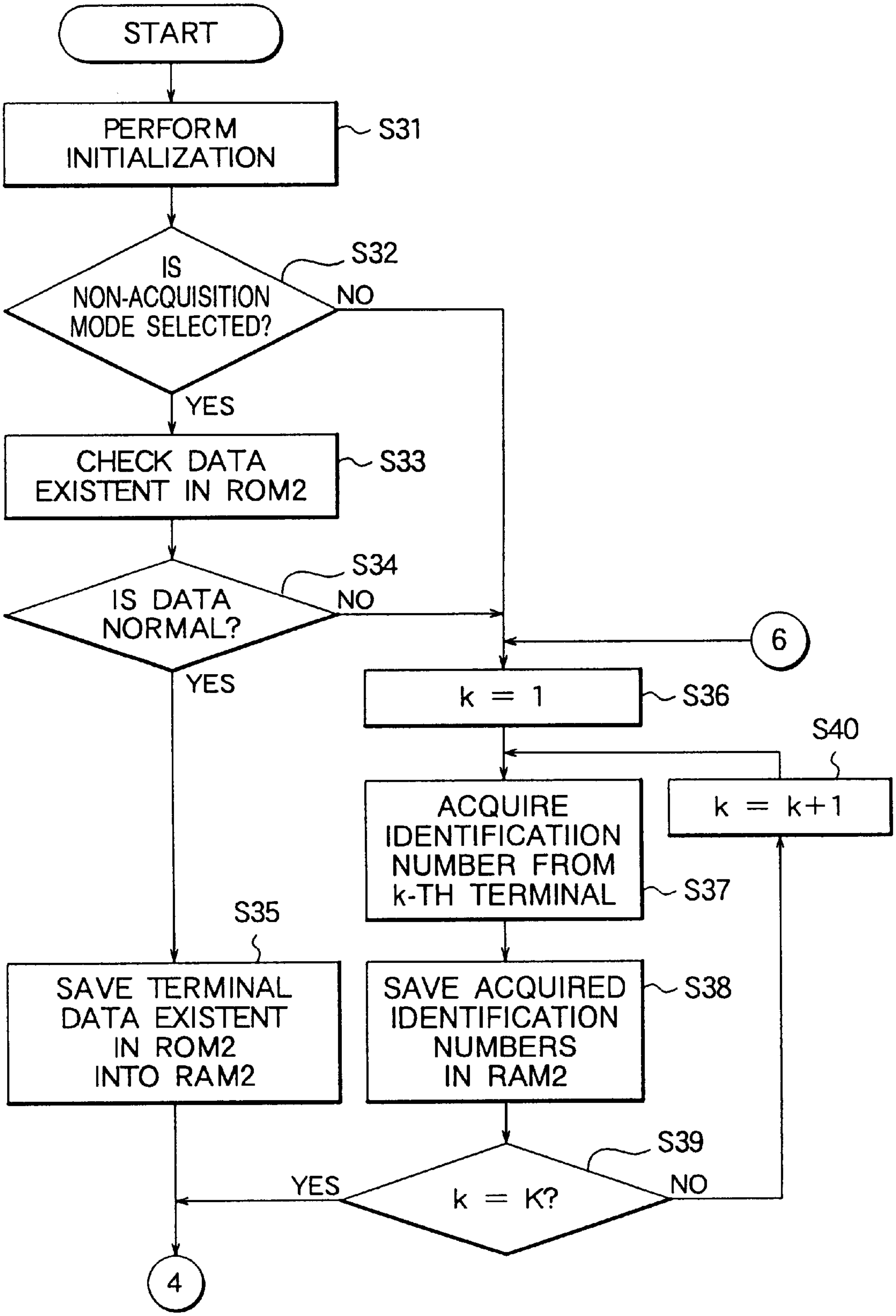
FIG. 8 is a flowchart showing one half of the operation of the fire alarm system according to a fourth embodiment of the present invention.
Figure 9:
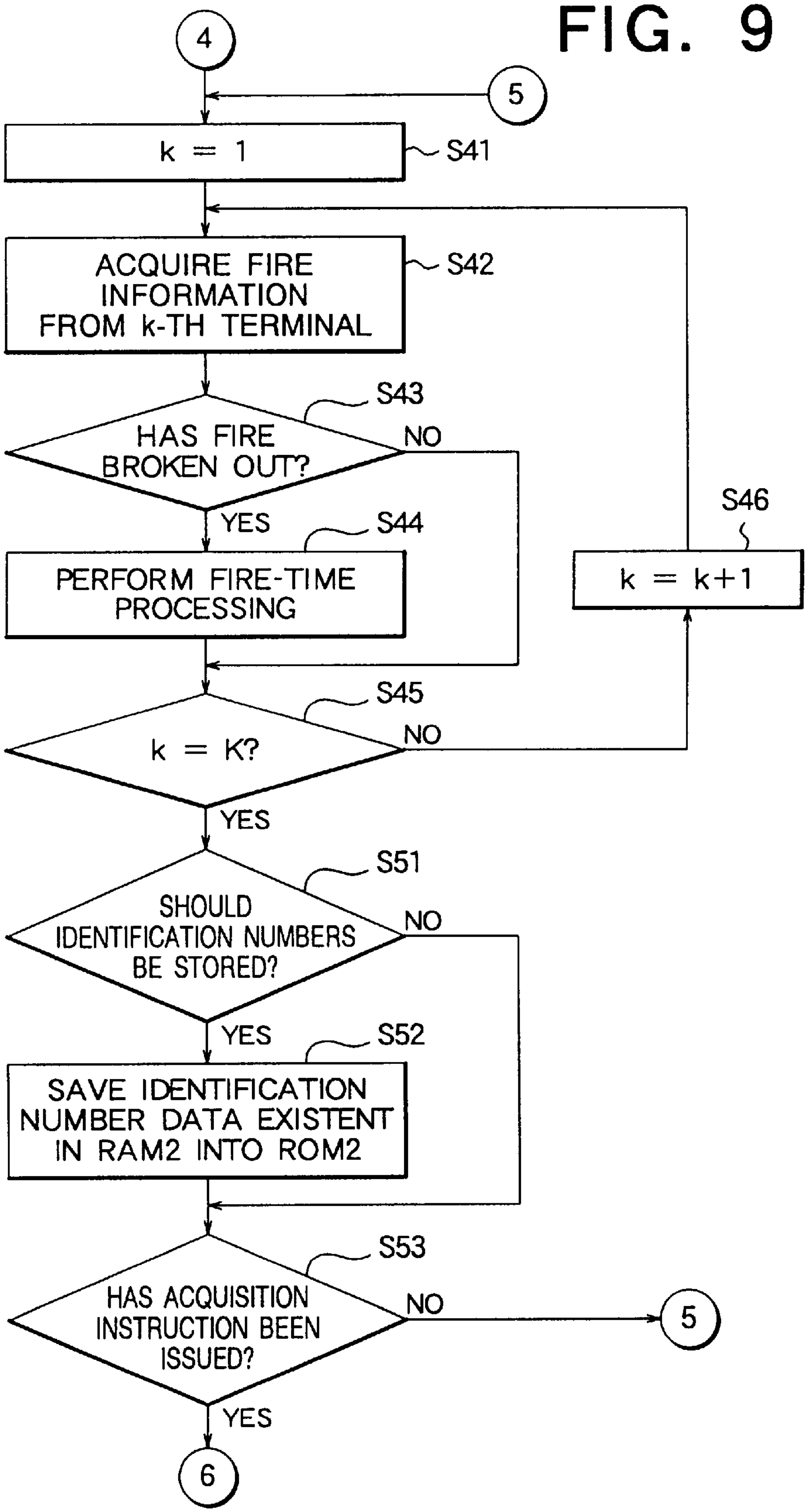
FIG. 9 is a flowchart showing the other half of the operation of the fire alarm system continuous to FIG. 8.

FIG. 8 and FIG. 9 are flowcharts showing an operation according to a fourth embodiment of the present invention. The fourth embodiment is different from the second embodiment shown in FIG. 4 and FIG. 5 in a feature described below. Namely, an acquisition instruction switch (not shown) is added to the operation unit OP included in the fire control and indicating equipment RE in FIG. 1. The acquisition instruction switch is used to acquire identification number information (type information) from the terminals including the fire sensors SE1 and SE2 and the transmitter TR3. If a judgment is made in the negative at step S51 or after step S52 is completed, an action of step S53 is carried out for judging if the acquisition instruction switch has been manipulated. If a judgment is made in the negative at the step S53, that is, if the acquisition instruction switch has not been manipulated, control is returned to step S41. If a judgment is made in the affirmative at step S53, that is, if the acquisition instruction switch has been manipulated, control is returned to step S36. The fourth embodiment is identical to the second embodiment except this point.

Assume that the acquisition instruction switch (or an acquisition instruction switch, which is not shown, included in a transmitter serving as a reception unit) of the operation unit OP included in the fire control and indicating equipment RE is manipulated over a predetermined time (for example, 5 sec) in the course of fire supervision consisting of step S41 and subsequent steps. Owing to the foregoing system structure, the fire control and indicating equipment RE (or a transmitter serving as a reception unit) acquires, similarly to the one in the second embodiment, identification number information successively from the terminals SE1, SE2, TR3, etc. The acquired information is saved in the RAM 2 (steps S36 to S39). Assume that the storage switch of the operation unit OP has been manipulated ("Yes" at step S51). In this case, the identification number information of the terminals SE1, SE2, TR3, etc. existent in the RAM 2 is, similarly to that in the second embodiment, saved in the ROM 2 (EEPROM) (step S52).

If it is found at step S53 that the acquisition instruction switch has been manipulated, identification number information is acquired from the terminals. At the same time, the acquired identification number information may automatically be stored in the ROM 2. Moreover, the action of step S53 may be performed between steps S46 and S42. In this case, if a judgment is made in the negative at step S53, control is passed to step S42.

In the aforesaid embodiments, the plurality of terminals are designated separately with their addresses in order to poll the terminals. For example, the plurality of terminals may be designated in units of a group and polled. Any other method may be adopted.

What is claimed is:

1. A fire alarm system comprising:

a plurality of fire supervising or control terminals serving as fire detectors and having identification number information assigned thereto that varies depending on the type of a terminal; and a reception unit connected to said plurality of fire supervising or control terminals;

said reception unit comprising:

a nonvolatile memory for storing therein the identification number information of said plurality of terminals connected to said reception unit;

acquisition means for acquiring identification number information from said plurality of terminals;

rewriting means for, in response to an instruction, storing the identification number information of said plurality of terminals acquired by said acquisition means in said nonvolatile memory so as to rewrite the contents of said nonvolatile memory, wherein said rewriting means comprises a mode setter for specifying a non-acquisition mode in said nonvolatile memory when the identification number information acquired by said acquisition means is stored in said nonvolatile memory in order to rewrite the contents of said nonvolatile memory; and mode judging means for, when said reception unit is powered or reset, judging if the non-acquisition mode has been specified in said nonvolatile memory, so that it carries out fire supervision according to the identification number information stored in said nonvolatile memory when the non-acquisition mode has been specified, but allows said acquisition means to acquire identification number information from said plurality of terminals, while carrying out fire supervision according to the acquired identification number information when the non-acquisition mode has not been specified.

2. The fire alarm system according to claim 1, wherein different addresses are assigned to said plurality of terminals; said acquisition means acquires the addresses from said plurality of terminals together with identification number information; and the addresses are stored in said nonvolatile memory together with the identification number information.

3. The fire alarm system according to claims 1, wherein said fire detectors are fire sensors.

4. The fire alarm system according to claim 1, wherein said fire detectors are transmitters to which a fire sensor or a device to be controlled is connected.

5. A fire alarm system according to claim 1, said reception unit further comprising acquisition instructing means for outputting an acquisition instruction for allowing said acquisition means to acquire information.

6. The fire alarm system according to claim 5, wherein said rewriting means stores the identification number information of said plurality of terminals, which said acquisition means has acquired in response to an acquisition instruction sent from said acquisition instructing means, in said nonvolatile memory so as to rewrite the contents of said nonvolatile memory.

7. The fire alarm system according to claim 5, wherein said fire detectors are fire sensors.

8. The fire alarm system according to claim 5, wherein said fire detectors are transmitters to which a fire sensor or a device to be controlled is connected.

9. A fire alarm system comprising:

a plurality of fire supervising or control terminals serving as fire detectors and having identification number information assigned thereto that varies depending on the type of a terminal; and a reception unit connected to said plurality of fire supervising or control terminals;

said reception unit comprising:

a nonvolatile memory for storing therein the identification number information of said plurality of terminals connected to said reception unit;

acquisition means for acquiring identification number information from said plurality of terminals; and supervision instructing means for instructing whether fire supervision should be performed based on the contents of said nonvolatile memory or fire supervision should be performed by acquiring identification number information from said plurality of terminals using said acquisition means;

wherein during the time said supervision instructing means instructs that fire supervision should be performed based on the contents of said nonvolatile memory, said reception unit checks the contents of said nonvolatile memory when said reception unit is powered or reset, acquires identification number information from said plurality of terminals through said acquisition means if the contents of said nonvolatile memory are abnormal, and performs fire supervision according to the identification number information acquired by said acquisition means.

10. The fire alarm system according to claim 9, wherein said reception unit further comprises storage instructing means for storing the identification number information acquired by said acquisition means, said storage instructing means being operated upon manipulation thereof such that the identification number information acquired by said acquisition means is stored in said nonvolatile memory in order to rewrite the contents of said nonvolatile memory.

11. The fire alarm system according to claim 9, wherein different addresses are assigned to said plurality of terminals; said acquisition means acquires the addresses from said plurality of terminals together with identification number information; and the addresses are stored in said nonvolatile memory together with the identification number information.

12. The fire alarm system according to claim 9, wherein said fire detectors are fire sensors.

13. The fire alarm system according to claim 9, wherein said fire detectors are transmitters to which a fire sensor or a device to be controlled is connected.

14. A fire alarm system according to claim 9, said reception unit further comprising acquisition instructing means for outputting an acquisition instruction for allowing said acquisition means to acquire information.

15. The fire alarm system according to claim 14, said reception unit further comprises rewriting means for storing the identification number information of said plurality of terminals, which said acquisition means has acquired in response to an acquisition instruction sent from said acquisition instructing means, in said nonvolatile memory so as to rewrite the contents of said nonvolatile memory.

16. The fire alarm system according to claim 14, wherein said fire detectors are fire sensors.

17. The fire alarm system according to claim 14, wherein said fire detectors are transmitters to which a fire sensor or a device to be controlled is connected.

18. A fire alarm system comprising:

a plurality of fire supervising or control terminals serving as fire detectors and having identification number information assigned thereto that varies depending on the type of a terminal; and a reception unit connected to said plurality of fire supervising or control terminals;

said reception unit comprising:

a nonvolatile memory operable to store therein the identification number information of said plurality of terminals connected to said reception unit;

acquisition device operable to acquire identification number information from said plurality of terminals;

rewriting device operable to, in response to an instruction, store the identification number information of said plurality of terminals acquired by said acquisition device in said nonvolatile memory so as to rewrite the contents of said nonvolatile memory, wherein said rewriting device comprises a mode setter operable to specify a non-acquisition mode in said nonvolatile memory when the identification number information acquired by said acquisition device is stored in said nonvolatile memory in order to rewrite the contents of said nonvolatile memory; and mode judging device operable to, when said reception unit is powered or reset, judge if the non-acquisition mode has been specified in said nonvolatile memory, so that it carries out fire supervision according to the identification number information stored in said nonvolatile memory when the non-acquisition mode has been specified, but allows said acquisition device to acquire identification number information from said plurality of terminals, while carrying out fire supervision according to the acquired identification number information when the non-acquisition mode has not been specified.

19. The fire alarm system according to claim 18, wherein different addresses are assigned to said plurality of terminals; said acquisition device is operable to acquire the addresses from said plurality of terminals together with identification number information; and the addresses are stored in said nonvolatile memory together with the identification number information.

20. The fire alarm system according to claim 18, wherein said fire detectors are fire sensors.

21. The fire alarm system according to claim 18, wherein said fire detectors are transmitters to which a fire sensor or a device to be controlled is connected.

22. A fire alarm system according to claim 18, said reception unit further comprising acquisition instructing device operable to output an acquisition instruction for allowing said acquisition device to acquire information.

23. The fire alarm system according to claim 22, wherein said rewriting device is operable to store the identification number information of said plurality of terminals, which said acquisition device has acquired in response to an acquisition instruction sent from said acquisition instructing device, in said nonvolatile memory so as to rewrite the contents of said nonvolatile memory.

24. The fire alarm system according to claim 22, wherein said fire detectors are fire sensors.

25. The fire alarm system according to claim 22, wherein said fire detectors are transmitters to which a fire sensor or a device to be controlled is connected.

26. A fire alarm system comprising:

a plurality of fire supervising or control terminals serving as fire detectors and having identification number information assigned thereto that varies depending on the type of a terminal; and a reception unit connected to said plurality of fire supervising or control terminals;

said reception unit comprising:

a nonvolatile memory operable to store therein the identification number information of said plurality of terminals connected to said reception unit;

acquisition device operable to acquire identification number information from said plurality of terminals; and supervision instructing device operable to instruct whether fire supervision should be performed based on the contents of said nonvolatile memory or fire supervision should be performed by acquiring identification number information from said plurality of terminals using said acquisition device;

wherein during the time said supervision instructing device instructs that fire supervision should be performed based on the contents of said nonvolatile memory, said reception unit is operable to check the contents of said nonvolatile memory when said reception unit is powered or reset, acquire identification number information from said plurality of terminals through said acquisition device if the contents of said nonvolatile memory are abnormal, and perform fire supervision according to the identification number information acquired by said acquisition device.

27. The fire alarm system according to claim 26, wherein said reception unit further comprises storage instructing device operable to store the identification number information acquired by said acquisition device, said storage instructing device being operated upon manipulation thereof such that the identification number information acquired by said acquisition device is stored in said nonvolatile memory in order to rewrite the contents of said nonvolatile memory.

28. The fire alarm system according to claim 26, wherein different addresses are assigned to said plurality of terminals; said acquisition device is operable to acquire the addresses from said plurality of terminals together with identification number information; and the addresses are stored in said nonvolatile memory together with the identification number information.

29. The fire alarm system according to claim 26, wherein said fire detectors are fire sensors.

30. The fire alarm system according to claim 26, wherein said fire detectors are transmitters to which a fire sensor or a device to be controlled is connected.

31. A fire alarm system according to claim 26, said reception unit further comprising acquisition instructing device operable to output an acquisition instruction for allowing said acquisition device to acquire information.

32. The fire alarm system according to claim 31, said reception unit further comprises rewriting device operable to store the identification number information of said plurality of terminals, which said acquisition device has acquired in response to an acquisition instruction sent from said acquisition instructing device, in said nonvolatile memory so as to rewrite the contents of said nonvolatile memory.

33. The fire alarm system according to claim 31, wherein said fire detectors are fire sensors.

34. The fire alarm system according to claim 31, wherein said fire detectors are transmitters to which a fire sensor or a device to be controlled is connected.

* * * * *